United States Patent
Davidson et al.

(10) Patent No.: US 12,400,011 B1
(45) Date of Patent: Aug. 26, 2025

(54) INTEGRATED WORKSPACE FILE SYSTEM

(71) Applicant: Databricks, Inc., San Francisco, CA (US)

(72) Inventors: Aaron Daniel Davidson, Berkeley, CA (US); Anders Leif Christian Rex, San Francisco, CA (US); Jason Yongjoon Kim, San Francisco, CA (US); Ka-Hing Cheung, San Francisco, CA (US); Sai Teja Pratap Reddy Suram, Redwood City, CA (US); Xinmei Gui, San Mateo, CA (US)

(73) Assignee: Databricks, Inc., San Francisco, CA (US)

( * ) Notice: Subject to any disclaimer, the term of this patent is extended or adjusted under 35 U.S.C. 154(b) by 483 days.

(21) Appl. No.: 17/515,013

(22) Filed: Oct. 29, 2021

Related U.S. Application Data

(60) Provisional application No. 63/160,623, filed on Mar. 12, 2021.

(51) Int. Cl.
*G06F 21/62* (2013.01)

(52) U.S. Cl.
CPC ................................ *G06F 21/6218* (2013.01)

(58) Field of Classification Search
CPC ..... H04L 63/123; H04L 63/101; H04L 63/08; H04L 63/102
See application file for complete search history.

(56) References Cited

U.S. PATENT DOCUMENTS

| | | | |
|---|---|---|---|
| 2010/0287013 A1* | 11/2010 | Hauser | G06Q 10/06375 705/7.37 |
| 2013/0132439 A1* | 5/2013 | Misra | G06F 21/6218 707/784 |
| 2013/0238745 A1* | 9/2013 | Ramachandran | H04N 21/2396 709/217 |
| 2017/0222997 A1* | 8/2017 | Kroehling | H04L 63/08 |
| 2018/0295134 A1* | 10/2018 | Gupta | H04L 67/56 |
| 2020/0019714 A1* | 1/2020 | Schnjakin | H04L 63/083 |
| 2020/0252404 A1* | 8/2020 | Padmanabhan | H04L 63/061 |
| 2020/0412768 A1* | 12/2020 | Hegde | H04L 63/10 |
| 2021/0256157 A1* | 8/2021 | Barday | G06F 21/604 |
| 2022/0187989 A1* | 6/2022 | Resch | G06F 3/0629 |

FOREIGN PATENT DOCUMENTS

JP     2015043131 A   * 3/2015

\* cited by examiner

*Primary Examiner* — Alexander Lagor
*Assistant Examiner* — Lydia L Noel
(74) *Attorney, Agent, or Firm* — Fenwick & West LLP

(57) ABSTRACT

The present application discloses a method, system, and computer system for providing an integrated workspace file system. The method includes receive a receiving a request to access a first file, determining a first user associated with the request to access the first file, determining whether the first user is authorized to access the first file, and in response to determining that the first user is authorized to access the first file: generating a uniform resource identifier (URI) associated with the first file, wherein the URI comprises a credential for accessing the first file, wherein the credential is based on a user credential and a first file access authorization, and providing the URI to a user system.

20 Claims, 7 Drawing Sheets

INTEGRATED WORKSPACE FILE SYSTEM

CROSS REFERENCE TO OTHER APPLICATIONS

This application claims priority to U.S. Provisional Patent Application No. 63/160,623 entitled INTEGRATED WORKSPACE FILE SYSTEM filed Mar. 12, 2021 which is incorporated herein by reference for all purposes.

BACKGROUND OF THE INVENTION

A system for big data processing comprises a system for deployments of applications, configurations, one or more datasets, and model(s) used in connection with analyzing the data. At scale, the one or more datasets are deployed in a distributed storage system such as a distributed cloud computing environment. A distributed storage system stores various files across many different storage devices, which creates difficulty for users to comprehend and navigate the distributed storage system to obtain desired files. Current representations of files stored in a distributed storage system lack intuitiveness compared to file system representations for files stored locally because such representations of files stored in a distributed storage system are not responsive to user interaction in a contemporaneous or real time manner.

BRIEF DESCRIPTION OF THE DRAWINGS

Various embodiments of the invention are disclosed in the following detailed description and the accompanying drawings.

DETAILED DESCRIPTION

Figure 1:
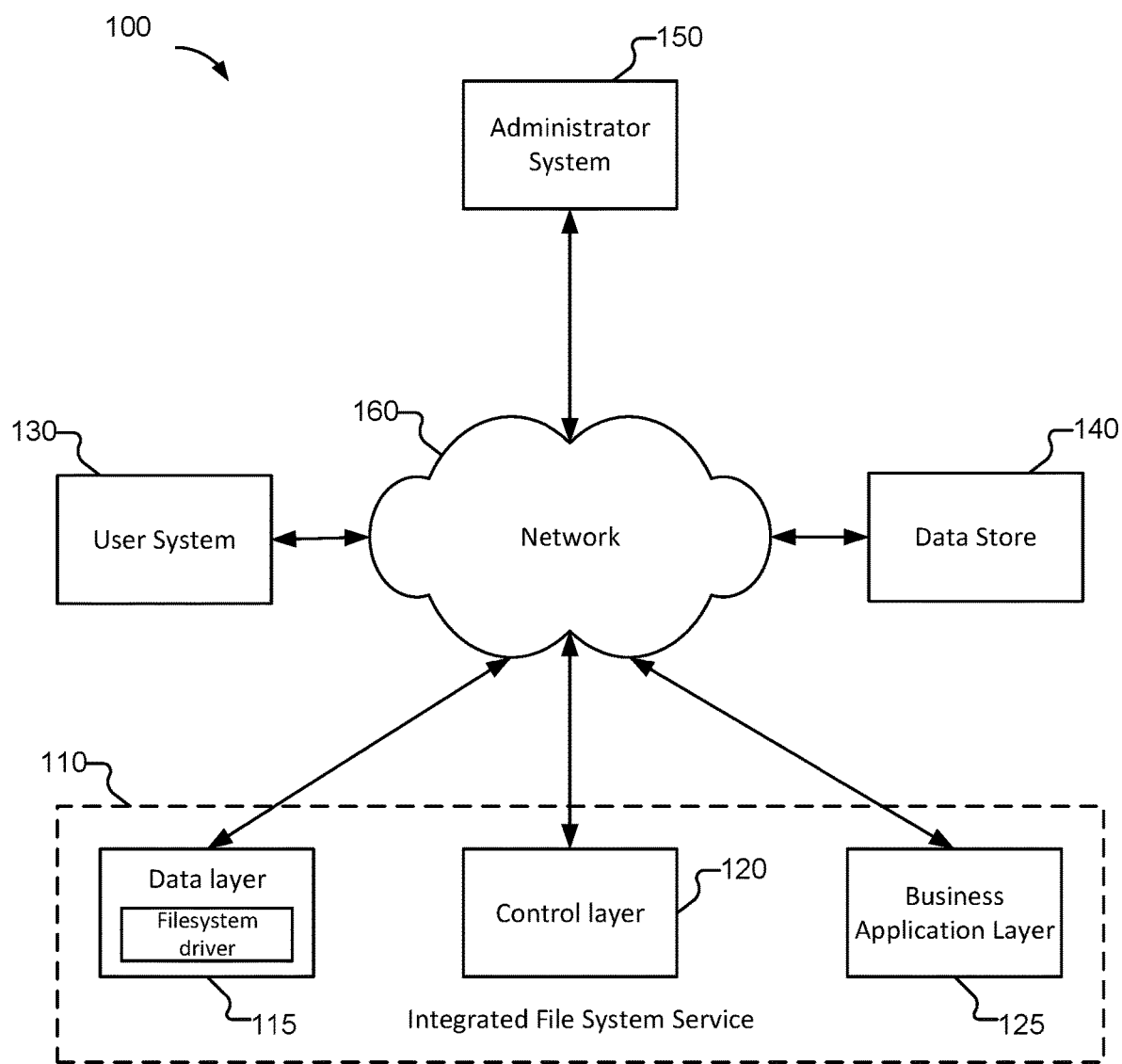
FIG. 1 is a block diagram of an integrated file system according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

According to various embodiments, a system for providing a file system for a distributed data storage system is disclosed. The system comprises one or more processors and a memory. The one or more processors are configured to receive a request to access a first file, determine a first user associated with the request to access the first file, determining whether the first user is authorized to access the first file, and in response to determining that the first user is authorized to access the first file: (i) generate a uniform resource identifier (URI) associated with the first file, wherein the URI comprises a credential for accessing the first file, wherein the credential is based on a user credential and a first file access authorization, and (ii) provide the URI to a user system.

In some embodiments, the URI comprises a URL that includes a pre-signed token that is used to access data. In some embodiments, a personal access token (PAT) is used to grant access to metadata. In response to the PAT being valid and the user has access to the file, a temporary token to access data in blob store is generated.

According to various embodiments, the system stores a set of two orthogonal tokens. The set of two orthogonal tokens comprises a first token corresponding to a customer (e.g., an organization/customer of the integrated file system service such as for which a plurality of users is associated). The set of two orthogonal tokens comprises a second token corresponding to a user (e.g., a user associated with an organization/customer of the integrated file system service). In some embodiments, the control layer uses the customer token (e.g., the first token) to access the distributed data storage system (e.g., a data store) to access a file or in connection with accessing metadata (e.g., stored at the control layer) pertaining to the distributed data storage system. As an example, the control layer replaces the customer token with the user token (e.g., the second token) when providing a user system with the URL for the file associated with an access request from the user system.

Various embodiments provide an intuitive file system that is responsive in real-time, or near real-time, to user inputs such as commands for reads and/or writes. The file system according to various embodiments represents a plurality of files stored in a distributed data storage system (e.g., across various data storage devices, etc.) in a manner similar to a local file system (e.g., a representation of files stored locally at a user system, etc.). For example, the system represents the files (which are stored in a distributed storage system) in a file system comprising directories, the system receives commands directed to files or directories, and contemporaneously performs functions with respect to the files or directories. In some embodiments, the system represents the file system in a user interface such as a web user interface (e.g., an interface rendered in a browser such as an interface of a notebook for code development). The user interface provided by the system is also referred to herein as the "workspace." The user may interact with the system via the user interface, including inputting file access requests and other commands pertaining to the files and directories. The system mediates the file system rendered for the user and/or the interaction between the user and the file system representation. For example, the system uses permissions for a user and/or files in mediating the connection between a user and/or the interaction between the user and the data stored in the distributed storage. In some embodiments, the system uses an identifier or credential (e.g., token) associated with a user in connection with determining whether a user has requisite permissions to perform an action or to view a particular file. In some embodiments, the system includes a split control plane/data plane setup. In some embodiments, everyone is the same user in the data plane, and the system mediates access to the data plane from a control pane by determining access permissions at the control plane layer and enabling controlled access to data via the data plane using URIs. In some embodiments, the split layer presents challenges: 1) users have different identities on the control plane and the data plane; 2) the trust boundary is different (e.g., the system trusts control plane services since the code is controlled, but data plane code is shared so is not controlled); and 3) APIs can be freely selected and used in the control plane, but in the data plane the system has to work with existing code and restrictions on propagating user credentials.

According to various embodiments, the system determines a set of one or more files to provide in the file system displayed in the workspace. The system generates a URI (e.g., a URL including a credential) for accessing a file in the set of one or more files. For example, the system determines a location of a file in the set of one or more files, and determines a credential (e.g., a token) to access the file. In response to determining the location of the file and the credential to access the file, the system generates the URL to include location information (e.g., pertaining to the location of the file) and credential information (e.g., the credential, or information identifying the credential or a location from which the credential can be retrieved). The system can associate the file (or representation of the file) in the workspace with the URL. In some embodiments, the system generates the URL using a credential of a control layer (also referred to herein as an "internal credential") to access the permission, and in response to receiving a request from a user to access the file the system configures the URL to replace the credential of the control layer with a credential associated with the user.

According to various embodiments, in response to receiving a command (e.g., based on a user input to the workspace), the system logs the command in association with the user. For example, the system stores the command and user in a mapping of commands to users. The mapping of commands to users is used in connection with determining whether a user is authorized (e.g., has requisite permissions) to perform a certain command such as accessing a particular file, deleting a particular file, copying a particular file, renaming a particular file, creating a new directory, etc. In some embodiments, the system determines one or more processes invoked in response to the command. As an example, the one or more processes are low-level or system-level processes. In response to determining the one or more processes (or in response to invocation of such processes), the system logs an association between the user that executed the command and/or the process. For example, a process has an associated process identifier (also referred to herein as a PID) that uniquely identifies the process among other processes executed by the system. The logging of the association between the user that executed the command and the process comprises storing a user identifier and an association with the PID(s) in a mapping of processes to users. In some embodiments, the logging of the association between a user and a process includes storing a mapping between one or more users with one or more processes (e.g., a plurality of users mapped to a given process, a plurality of processes mapped to a given user, a plurality of users mapped to a plurality of processes as appropriate, etc.). In various embodiments, the logging of the association between a user and a process includes one or more of the following: logging a command associated with the user and/or the process, logging one or more other processes invoking commands associated with the user and/or the process, logging one or more system calls associated with the user and/or the process, logging one or more queries associated with the user and/or the process, logging user information, logging process information, logging system call information, logging command information, logging query information, logging user input information (e.g., identifier, token identifier, time, date, system used, originating system, network information, originating network, etc.), logging source code and/or modules referenced in source code associated with the user input, command, or process, or any other associated information of the user and/or the process.

According to various embodiments, the system comprises a data layer. The data layer comprises a file system driver. The file system driver determines whether an operation (e.g., a command or process) is a data operation or an organization operation. In response to characterizing the operation (e.g., determining whether the operation is a data operation or organization operation), the system determines a module to invoke (e.g., send a request) in connection with executing the operation. In some embodiments, the data layer is shared among a plurality of users (e.g., users of an organization or customer of the integrated file system service). For example, the plurality of users log into a common account or instance on the integrated file system service. In some implementations because the plurality of users log into the same instance, the plurality of users appear to the system as the same user (e.g., the system thus identifies the user based on a user associated with originating a process corresponding to an operation). Because the data layer is shared among a plurality of users, determining a user associated with an operation at the data layer is difficult. In addition, the data layer of the system runs its own processes, so merely identifying a process is not sufficient to determine the user for which the process was invoked. The system traces operations at the data layer to commands, or processes invoked by the commands, and determines the user corresponding to the operation based at least in part on the user associated with the command, or processes invoked by the commands. As an example, the system determines an originator (e.g., originating user) of the command or process. For example, the system logs an association between the user that executed the command and/or the process. In some embodiments, the originator is determined based at least in part on a token associated with a user. The system receives a token from a browser of a user system via which the user is interfacing with the workspace. For example, the workspace is configured to cause the browser to send a token in connection with a user input such as a request to perform a command (e.g., the browser sends a session token, which is propagated to the control layer which uses the token for access control of a file). The token may be sent in conjunction with a user identifier that identifies the user that input the command. The token uniquely identifies the user among the plurality of users logged into the same instance of the system (e.g., the integrated file system service 110 of FIG. 1). In contrast, in related art systems the system identifies operations performed by a user based on the account within which a request is generated. For example, in related art systems for storing data in distributed data systems, each user logs into their own account or instance and thus all operations performed while the user is logged in are inherently operations associated with the user. Thus, related art systems do not need to trace users associated with commands and processes invoked based on a user input. In some embodiments, when a user reaches the data layer of the integrated file system service, the user has not logged in, or the user's operations are not mediated based on the user's credentials, and the credentials and/or access permissions are mediated when the operations or data access reaches (e.g., is intercepted by) the control layer of the integrated file system service.

In some embodiments, in response to a file being accessed by the control layer, the instance of the data layer caches the file. The file can be cached for a predetermined amount of time. For example, after expiry of the predetermined amount of time the file is flushed from the instance and subsequent accesses for the file are mediated through the control layer. The predetermined amount of time can be on the order of seconds or minutes. In some embodiments, the predetermined amount of time is set based on a historical access frequency for the file or for a file similar to the file being accessed (e.g., a file having the same type, a file being within the same directory, etc.), or based on a historical access pattern of the user requesting to access the file. As an example, the file is cached in the data layer because generally when a user requests to access a file, the user issues multiple access requests or commands with respect to the same file in a short period of time. Accordingly, on first use of the file, the file is cached at the data layer (e.g., after being retrieved by the control layer) and subsequent uses of the file are performed with respect to the cached version of the file (e.g., if the predetermined amount of time has not expired). Generally, the file in the data layer (e.g., in a data store) corresponding to the cached file is unlikely to be modified during the predetermined amount of time.

Users generally want access and processes to be faster. For example, in connection with development of code, users generally want arbitrary files against which to run code being developed. For example, users use csv files or other data in connection with testing code being developed. In the case of a web-based development interface, users generally want a low latency with respect to running code against files or data. Certain programming languages or environments, such as python, generally attempt to lookup a file in a certain repository. For example, the programming language or environment is associated with a particular repository such that lookups for a file are performed with respect to such repository. In some embodiments, the system has knowledge of whether a file is stored in a repository or elsewhere. For example, the control layer stores an index of files. The index can correspond to a master index structure that identifies a location of a file (e.g., a file path for the file). The system uses the index in connection with determining whether the file is stored at the repository with respect to which the programming language or environment is configured to perform a lookup. In response to determining that the file is not stored at such repository, the system is configured to skip the lookup of the repository. Performing lookups to a data store is generally slower than from performing a lookup with respect to a native system. For example, communicating with the data store over a network to perform a lookup adds latency, and thus using the lookup in the index of the control layer is quicker and reduces latency in determining whether a file is stored at the repository. According to various embodiments, in response to a request to access a file, the system performs a lookup using the control layer (e.g., the master index structure stored locally at the control layer) before sending a query to the data store to perform a lookup for a file. If a file is to be imported, the file is cached at the data layer to reduce latency of future requests with respect to such file (e.g., at least for a predetermined amount of time before flushing the file from the data layer cache).

According to various embodiments, the control layer stores an index (e.g., a master index structure) that provides an index of file locations and/or metadata (e.g., permissions) for files stored across a distributed data storage system. In some embodiments, access to files is mediated through the control layer because the control layer uses the index to identify a corresponding location for a particular file. For example, without access to the index a user system would not be able to determine where to access a file across a distributed data storage system such as a blob storage. The control layer uses the index in connection with transforming the data stored in a non-hierarchical manner in the distributed data storage system to a hierarchical representation such as a file structure provided at the workspace via which the user system interfaces with the integrated file system service. For example, the index provides the control layer with hierarchical relationships among files. The control layer can also authenticate access to files stored in the distributed data storage system. In some embodiments, the control layer intercepts a request to access a file such as a request generated in response to a user input at a user system. As an example, the request to access the file is generated based on a user input to a workspace provided at the user system (e.g., a request to invoke a user command process at the data layer), and the control layer intercepts the request to access the file (e.g., the control layer mediates access to the distributed data storage system by the data layer—for example, a process running on data layer—based on interception of a request to access the file that invokes a process within the data layer to access the file). In some embodiments, the data layer comprises a plurality of nodes in a distributed processing system, which comprises a master node and a set of worker nodes. According to various embodiments, a small amount of metadata is stored in the control layer and a large amount of data is stored in the data layer such as in the data store. In some embodiments, the index is used to pre-fetch likely files associated with a request (e.g., files associated by being in the same directory, files referenced by a piece of code, files referenced in an associated library, files associated by any other linking mechanism, etc.) and caches the pre-fetch files to reduce access time.

According to various embodiments, the system performs a list lookup with respect to a directory of files stored in the distributed data storage system. For example, to avoid multiple lookups at the control layer to determine whether a file is in the directory, a list request is performed to determine files within the directory. Performing the list request improves the latency on the system by reducing the individual lookups for files within a directory. As an example, in the first lookup of a python file, a list request is issued to the control layer, and the responsive list is cached in the data layer (e.g., to avoid further lookups for other individual files). Performance of many file lookups (e.g., to the backend such as the distributed data storage system) can require translation of the file or metadata associated with the file (e.g., mediation) in the control layer to determine whether the lookup has the appropriate permissions (e.g., whether the user associated with the lookup has the requisite permissions). In some embodiments, performing a list request to obtain information indicating files stored in the current directory reduces the number of file lookups performed against the backend. For example, the system can use the information indicating files stored in the current directory to determine whether to send an access request or lookup directly to the system file system (e.g., which is mediated by the control layer) rather than sending an access request or lookup to the backend for the file in the current directory.

According to various embodiments, the distributed data storage system stores data pertaining to a plurality of users and a plurality of customers (e.g., different organizations or customers of the integrated file system service). For example, the distributed data storage system is a multi-tenanted data system. Data for different customers is virtually segregated such as based on metadata (e.g., permissions) stored at the control layer. In some embodiments, virtual segregation comprises segregating data by storing in different virtual machines. In some embodiments, data is segregated by customer and doesn't depend on permissions stored at control layer. In some embodiments, data are also stored in distinct storage system buckets (e.g., S3 storage system buckets). In some embodiments, data is logically segregated rather than virtually segregated. In some embodiments logical segregation comprises storing data in multiple folders or disk partitions where each folder or partition has its own encryption key or credential. For example, the control layer mediates access to a set of data for a particular customer based on access permissions that is managed or stored at the control layer. In contrast, in related art systems, each user or customer has its own storage container (e.g., blob storage container) that is physically segregated from storage containers of other users or customers. For example, a related art system organizes data according to a customer account and the customer's data is physically segregated from other customers.

According to various embodiments, the system synchronizes user input with one or more files stored on the distributed data storage system. In some embodiments, the system provides a notebook on the workspace such as via a browser. As an example, as a user types characters into the notebook, the system synchronizes the user inputs to the notebook with the information stored in the integrated file system service (e.g., information stored at the data layer). The system synchronizes such user inputs contemporaneous with the user input (e.g., in substantial real time with the user input). In some embodiments, the system comprises a plurality of connections established with a plurality of user systems at a particular time. As an example, a number of user systems in the order of hundreds are synchronously accessing data stored in the distributed data storage system. As another example, the system comprises at least a hundred user systems accessing the same data stored in the system, and the users can simultaneously update the data. In contrast, related art systems for storing data in distributed data storage systems perform a synchronization asynchronous to a user input to a file, etc. For example, in related art systems, changes are queued and performed in a batch at a later time.

According to various embodiments, the system obtains the source code for a module imported by the user system (e.g., a module or library that a user develops/imports into the notebook comprising code being developed, etc.). The system analyzes the source code for the imported module and determines one or more other modules that are referenced by the imported module or that are to be executed during execution of the imported module. In response to determining the one or more modules, the system requests at least one of the one or more modules. For example, the system pre-fetches at least a subset of the one or more modules. The system requests the subset of the one or more modules from the backend before execution of the imported module, or before the imported module calls the subset of the one or more modules during execution of the imported module. In some embodiments, the system pre-fetches all modules one or more other modules that are referenced by the imported module or that are to be executed during execution of the imported module. The pre-fetched modules are stored (e.g., locally) in the data layer or the control layer.

In some implementations, when a user executes a command in the workspace, a time-limited personal access token (PAT) is sent from the control layer (e.g., control layer 120 of system 100 of FIG. 1) to the data layer (e.g., data layer 115 of system 100) where the command is executed. For a python notebook, a new process (e.g., a python process) is created and then used to execute commands that the user input. In connection with a new process being created, the pair of PID and PAT (also referred to herein as the PID/PAT pair) is sent to the workspace file system. For example, the PID/PAT pair is sent to the workspace file system via a remote procedure call (RPC). When python code accesses a file, a kernel of the operating system (e.g., a Linux kernel) sends (e.g., to the workspace) (i) information pertaining to the file that the process is opening, and (ii) a PID associated with the process. In some embodiments, the PID sent in connection with accessing the file can be the PID associated with the process created to execute the command corresponding to a user input (e.g., the PID comprised in the RPC above). In some embodiments, the PID sent in connection with accessing the file can be a PID associated with a subprocess or thread launched in connection with performing the command. If the workspace file system receives a PID from the operating system kernel, the workspace file system walks a process tree to find a process for the PID-PAT mapping to which it corresponds. In some embodiments, to perform an additional check that the appropriate process is identified in the process tree, the system (e.g., the workspace file system) determines whether a process start time of the received RPC matches the process identified in the process tree. In some embodiments, when the process terminates, the system (e.g., the workspace file system) sends the same RPC in conjunction with (or comprising) an empty token so that when the RPC is stored in a mapping, the mapping is cleared. In some embodiments, in connection with accessing a file such as for reading data, the system (e.g., the workspace file system) sends a token and location of the file (e.g., file path) to the control layer. The control layer determines whether the corresponding file (or that the file path) is permitted to be accessed by the token received (e.g., the PAT). In response to determining that the request using the token is permitted to access the file, a URL is returned to the workspace file system. The URL can be pre-signed by the control layer using a token for the control layer (or a token for the user requesting access to the file by replacing a token for the control layer). The workspace file system can use the URL to read the file. In some embodiments, the URL can be used for a predefined period of time. For example, the token or URL expires after the predefined period of time.

In some implementations, on startup the processing engine (e.g., a unified analytics engine for large-scale data processing such as Apache Spark™, etc.) sends a secret to the workspace file system. For example, the secret can be sent to the workspace file system before any user code is executed. When a new process is invoked, the processing engine remembers (e.g., stores locally) a PID-PAT pair. In response to a user command to access a file being invoked, the workspace file system traverses a process tree to find the originating process (e.g., python process) launched by the processing engine, and the workspace file system sends a RPC to request the PAT associated with invocation of the process. In some embodiments, the RPC sent by the workspace file system to request the PAT comprises the secret (e.g., a secret corresponding to the user of the workspace). In response to termination of the process, an internal mapping of the PID to PAT for such process is cleared such as by the processing engine.

According to various embodiments, a user opens a file browser and navigates to a desired directory using the control layer (e.g., a web user interface such as an interface provided by a browser at a user system). In response to receiving the access request, the control layer calls the workspace/list using the user's login credentials or a token associated with the control layer, and the workspace/list returns the list of files in the directory if the user has access to the directory. In some embodiments, the call for the workspace/list also returns data locations of the files in the directory (e.g., the files are stored in the storage buckets such as virtualized storage buckets of the distributed data storage systems that customers own and have access to in the distributed computing environment). Canonically, the file metadata (e.g., data location, name, access control, modified time, checksum for the data) is stored in a database in the control layer. Using the user interface on the user system, a user clicks on a particular file (e.g., a file within the directory corresponding to the request to navigate to the directory). The system calls workspace-files/read, which calls workspace/get-status, which returns the data location of the file if the user has access to that directory (e.g., the system checks the location of the file again because the location could have changed because user modifies the file). The data is stored in a distributed data storage system such as a blob storage (e.g., the data is read from the data location and stored somewhere else in a blob storage and that this blob storage location is stored in the file metadata in the database on control layer and the data location points to the storage container associated with, or owned by, the customer, and the location of the file is stored in the file metadata), which is mapped from the file metadata from distributed data storage system. If user modifies the file, the system stores the new data to a new data location. For example, in the background, the system delete the old data in the previous data location.

According to various embodiments, data is located in a customer storage bucket of a distributed data storage system (e.g., the customer storage bucket is associated with, or owned by, the customer and is accessible from the distributed computing environment). The control layer is considered trusted (e.g., by the customer storage bucket), and the system (e.g., the control layer) uses internal credential(s) (e.g., internal credential(s) that is/are not associated with any particular user, an internal credential that is generally associated with the customer, etc.). In some embodiments, the credential(s) is/are not shared outside the system. In some embodiments, as part of customer sign up or registration with the system, the customer grants the system (e.g., the control layer) access to the customer storage bucket such as from the control layer service. The internal credential enables the control layer to access the customer storage bucket. In response to a user executing a command, the system sends a command execution request from the control layer to a cluster running in the data layer (e.g., a cluster of machines running in a segment associated with the customer). The command execution request comprises the command to be executed, and also a token (e.g., the token is for the control layer, so that data layer can use the token to make requests to the control layer) that authenticates the user with other service of the control layer. In some embodiments, in response to receiving the request to execute the command (e.g., the user command), the system invokes (e.g., launches) a process that will execute the command. The process that is invoked is associated a process identifier (e.g., the PID), which is local to the system. In some embodiments, an RPC is sent to the file system driver to create a mapping (e.g., this mapping is stored at runtime in the file system driver on the cluster nodes) between the PID and the token for the data layer to access service provided by the control layer. In response to invocation of the process, the process runs code that is in the request to execute the command. If the code being run by the process needs to do a file system operation against the distributed file system, the process sends the request via the local file system interface (e.g., local file system interface between the user command and the operating system; the distributed file system driver presents itself as a local file system) through the operating system kernel (e.g., the linux kernel such as the operating system kernel for all the processes running in the distributed cluster). According to various embodiments, each node in the cluster in the data layer comprises an operating system kernel. The operating system kernel sends the request to a file system driver in the data layer, along with the local user and the PID of the process. In some embodiments, the local user corresponds to a customer account. For example, the local user is the same for all code executed on a cluster (e.g., the cluster for executing code by different users). As an example, each user associated with a customer corresponds to the same local user at the data layer.

According to various embodiments, in response to receiving the request at the file system driver of the data layer, the file system driver looks up the PID in a mapping of PIDs to tokens to access services at the control layer (e.g., a token associated with a customer), and the file system driver obtains the token. In some embodiments, the file system drive uses the control layer to perform a lookup with respect to the mapping of PIDs to tokens to access services at the control layer. In response to obtaining the token corresponding to the PID, the file system driver (or control system) determines if the user has authorization to access the file such as based on the token, and in response to determining that the user has authorization to access the file, the file system driver sends a call for a workspace/list or workspace/get-status to obtain the data location (e.g., location corresponding to the file). In the background, file system driver obtains a time-limited, secure, per-customer credential (e.g., a credential generated by service running in the compute cluster of the system, and that is only stored in memory) that allows the file system driver to access the customer storage bucket. According to various embodiments, the file system driver uses the data location and the time-limited, secure, per-customer credential to perform the file system operation (e.g., file system operations, such as read, write, list directory, etc.). In various embodiments, the credential is not a per-customer credential and instead is a per workspace credential, a per account credential (e.g., where a customer can have more than one account), or any other appropriate credential. In various embodiments, a user is assigned to one or more accounts and/or one or more workspaces by a customer.

Various embodiments improve the representation of files stored in non-hierarchical manner in the distributed data storage system and the authorization to access files in the distributed data storage system based on users associated with system-level processes executed in performance of the file access. The system further improves the efficiency and/or latency associated with executing code being developed based at least in part on pre-fetching of modules linked to, or reference by, source code of a module such as a module imported into code being developed in a workspace.

FIG. 1 is a block diagram of an integrated file system according to various embodiments of the present application. According to various embodiments, system 100 implements at least part of system 200 of FIG. 2. In some embodiments, system 100 implements at least part of process 300 of FIG. 3, process 400 of FIG. 4, process 500 of FIG. 5, process 600 of FIG. 6, and/or process 700 of FIG. 7.

In the example illustrated in FIG. 1, system 100 includes integrated file system service 110, user system 130, data store 140, and/or administrator system 150. In some embodiments, integrated file system service 110 and/or data store 140 are integrated (e.g., combined into a layer or a single set of server(s)). In some embodiments, integrated file system service 110 comprises data layer 115, control layer 120, and/or business application layer 116. In some embodiments, data layer 115 comprises a file system driver. System 100 further includes one or more networks such as network 160 over which user system 130 and/or administrator system 150 communicates with integrated file system service 110 and/or data store 140. In various embodiments, network 180 includes one or more of a wired network, and/or a wireless network such as a cellular network, a wireless local area network (WLAN), or any other appropriate network. In some embodiments, data layer 115, control layer 120, and/or business application layer 116 are respectively implemented by one or more servers. System 100 may include various other systems or devices.

According to various embodiments, data store 140 is a distributed data storage system. For example, data store 140 is a blob storage system. In some embodiments, data store 140 comprises data for a plurality of customers of integrated file system service 110 (e.g., different organizations or tenants registered with integrated file system service 110). As an example, the data for the plurality of customers is not physically divided or segregated. For example, data among the plurality of customers is virtually segregated (e.g., the data is segmented among a customer storage buckets respectively associated with a particular customer). In some embodiments, data stored in data store 140 is encrypted such as by using a token associated with a particular customer. In some embodiments, access to data in the data store 140 is mediated by control layer 120 of integrated file system service 110. For example, control layer 120 stores metadata pertaining to data (e.g., files) stored on the data store. As an example, control layer 120 stores an index of files to file locations. In some embodiments, control layer 120 stores a mapping of files to a hierarchical structure. For example, control layer 120 transforms non-hierarchical manner by which data is stored in data store 140 to a hierarchical structure corresponding to a customer (e.g., control layer 120 provides a representation of directories and files stored among the directories). In some embodiments, data store 140 comprises one or more datasets associated with a customer. For example, data store 140 stores files and data against which code (e.g., code being developed via a web interface at business application layer 125 via user system 130) is run against such as in connection with testing the code.

Integrated file system service 110 provides a workspace via which a user creates data or interacts with data stored in data store 140 such as in connection with testing code being developed (e.g., code being input to the workspace by user system 130) or with modifying files in the data store 140. In some embodiments, integrated file system service 110 provides a web application via which a user connects (e.g., using user system 130 and/or administrator system 150) and interfaces using an interface such as a web user interface. The web application can be accessible via a web browser installed at user system 130, etc. In some embodiments, the workspace comprises, or corresponds to, a notebook such as a web-based code development tool. In some embodiments, the web application is deployed on, or connected to, an instance for a particular customer of the integrated file system service. For example, a plurality of users of the customer login to the web application and the corresponding workspace uses the same local user on data layer 115 across the various users of the customer. In some embodiments, the web application is provided by business application layer 125 and/or control layer 120. For example, user input to the workspace is provided to a service running on control layer 120. As another example, the user input to the workspace is provided to business application layer 125, which in turn provides the user input to control layer 120.

According to various embodiments, integrated file system service 110 comprises data layer 115 and/or control layer 120. Integrated file system service 110 can further comprise business application layer 125. In some embodiments, integrated file system service 110 uses data layer 115 and/or control layer 120 to represent data stored in data store 140 (e.g., data stored in a non-hierarchical manner) in a hierarchical manner such as a manner comprising file directories and files stored across various file directories. As an example, integrated file system service 110 stores metadata corresponding to a mapping of files to a file system hierarchy. Integrated file system service 110 can use the mapping of files to a file system hierarchy to render one or more files and/or directories on the workspace in a corresponding hierarchy.

In some embodiments, integrated file system service 110 uses control layer 120 to mediate access to data stored in data store 140. For example, in response to a request to access the file, control layer 120 determines a location on data store 140 at which the file is stored. As another example, control layer 120 determines whether the user has authorization to access the file (e.g., based at least in part on a permissions associated with the user and/or the file). In some embodiments, integrated file system service 110 returns a URL to the user system from which the request to access the file is received. In some embodiments, the URL is generated based at least in part on the location of the file (e.g., a location on data store 140 at which the file is stored) and a permission associated with the user or the file. For example, the URL comprises the location of the location of the file and a credential for authentication to access the file (or information indicating a location at which the credential can be obtained). In some embodiments, the credential is a token. In some embodiments, control layer 120 generates the URL. As an example, the URL is generated by control layer 120 to include information indicating the location of the file and a credential corresponding to a customer token. Control layer 120 replaces the token (e.g., the customer token) in the URL with a token associated with a user (e.g., a user token) when the URL is used to access the file (e.g., as the control layer 120 mediates access to the file). For example, in response to the URL being selected by a user, control layer 120 replaces the token in URL with a user-specific token. In some embodiments, control layer 120 uses the customer token (e.g., a first token) to access the data store 140 to access a file or in connection with accessing metadata (e.g., stored at the control layer) pertaining to the data store 140. In some embodiments, control layer 120 replaces the customer token with the user token (e.g., a second token) when providing a user system 130 with the URL for the file associated with an access request from the user system.

In some embodiments, control layer 120 intercepts user inputs to the workspace (e.g., inputs to user system 130). For example, control layer 120 intercepts a request to access a file such as a request generated in response to a user input at user system 130. As an example, the workspace is configured to send user inputs (e.g., requests for file reads and/or writes via a web user interface) to control layer 120 (e.g., a service running on control layer 120) rather than directly to data store 140 or data layer 115. According to various embodiments, because control layer 120 intercepts requests to access a file stored at data store 140, control layer 120 can authenticate user permissions to access a file corresponding to the request (e.g., the request from user system 130). As an example, control layer 120 stores one or more security policies. The one or more security policies can include a mapping of permissions to files (e.g., user permissions for certain files, certain types of files, certain directories and/or files within such directories, group permissions, etc.). For example, control layer 120 uses the one or more security policies in connection with determining whether a customer or user has access to one or more files stored in data store 140.

According to various embodiments, data layer 115 comprises a cluster (e.g., a cluster of machines such as virtual machines). As an example, the cluster comprises at least one master node and one or more worker nodes. In some embodiments, a data layer 115 corresponding to a customer operates according to a particular local user. For example, data layer 115 is deemed a single local user in connection with performing operations for a plurality of users (e.g., commands input by various user systems such as user system 130). According to various embodiments, because the data layer 115 operations and/or processes are deemed to be performed under a single local user, integrated file system service 110 traces operations invoked by a user (e.g., logs users in association with commands or processes invoked based on user input to the workspace). In some embodiments, the file system driver of data layer 115 performs the tracing/logging of operations invoked by a user. As an example, the cluster in data layer 115 can perform operations without being invoked by any particular user, thus a distinction between operations invoked by a user (e.g., based on a user input) and operations invoked by the cluster without a specific user input is used in connection with mediating access to data store 140 (e.g., control layer 120 is able to perform the appropriate authentication for the access to the files/data on data store 140).

According to various embodiments, in response to receiving a command (e.g., based on a user input to the workspace), integrated file system service 110 (e.g., file system driver in data layer 115) logs the command in association with the user. For example, integrated file system service 110 stores the command and user in a mapping of commands to users. The mapping of commands to users is used in connection with determining whether a user is authorized (e.g., has requisite permissions) to perform a certain command such as accessing a particular file, deleting a particular file, copying a particular file, renaming a particular file, creating a new directory, etc. In some embodiments, integrated file system service 110 determines one or more processes invoked in response to the command. As an example, the one or more processes are low-level or system-level processes. In response to determining the one or more processes (or in response to invocation of such processes), the system logs an association between the user that executed the command and/or the process. For example, a process has an associated process identifier (also referred to herein as a PID) that uniquely identifies the process among other processes executed by the integrated file system service 110 (e.g., by data layer 115). The logging of the association between the user that executed the command and the process comprises storing a user identifier and an association with the PID(s) in a mapping of processes to users.

According to various embodiments, integrated file system service 110 pre-fetches certain files or modules that are expected to be used by the user or by data layer 115 such as in connection with executing code (e.g., code being developed or worked on by user system 130). In some embodiments, integrated file system service 110 obtains the source code for a module imported by the user system 130 (e.g., a module or library that a user develops/imports into the notebook comprising code being developed, etc.). Integrated file system service 110 analyzes the source code for the imported module and determines one or more other modules that are referenced by the imported module or that are to be executed during execution of the imported module. In response to determining the one or more modules, integrated file system service 110 requests (e.g., via control layer 120) at least one of the one or more modules. For example, the system pre-fetches at least a subset of the one or more modules. Integrated file system service 110 requests the subset of the one or more modules from the backend before execution of the imported module, or before the imported module calls the subset of the one or more modules during execution of the imported module. In some embodiments, integrated file system service 110 pre-fetches one or more other modules that are referenced by the imported module or that are to be executed during execution of the imported module. The pre-fetched modules are stored (e.g., locally) in data layer 115 or control layer 120.

According to various embodiments, business application layer 125 provides an interface via which a user (e.g., using user system 130) may interact with various applications such as a development application for developing a feature, a development application for developing a model, an application to update a code, an application to debug code, etc. Various other applications can be provided by business application layer 125. For example, a user queries data store 140 by sending a query/request to business application layer 125, which interfaces with data layer 115 (e.g., via control layer 120) to obtain information responsive to the query (e.g., business application layer 125 formats the query according to the applicable syntax and send the formatted query to data store 140). As another example, an administrator uses an interface provided/configured by business application layer 125 to configure (e.g., define) one or more security policies include access permissions to a feature. In some embodiments, business application layer 125 provides the workspace via which a user accesses integrated file system service 110 by user system 130 (e.g., by a web browser on user system 130).

According to various embodiments, system 100 comprises user system 130. User system 130 is used by a user (e.g., a developer such as a developer of code, a developer of a model, etc.) to communicate with integrated files system service 110 and/or data stored in data store 140. As an example, client system 130 communicates with integrated files system service 110 via a web-interface. In some embodiments, a user uses user system 130 to develop code at integrated files system service 110, to modify code at integrated files system service 110, to execute code at integrated files system service 110 (e.g., to execute code against data stored in data store 140), to query data store 140 (e.g., in connection with discovering code, a library, a module, etc.), etc.

According to various embodiments, system 100 comprises an administrator system 150 for use by an administrator such as an administrator of integrated file system service 110 or an administrator of a customer associated with an instance or tenant being deployed by data layer 115. For example, administrator system 150 comprises a system for communication, data access, computation, etc. An administrator uses administrator system 150 to maintain data store 140 (e.g. maintain raw data comprised in data store 140), to define and manage applications provided by integrated file system service 110, etc. For example, an administrator uses administrator system 150 to define one or more security policies that are to be enforced (e.g., by control layer 120) with respect to a data stored at data store 140. Administrator system 150 communicates with integrated file system service 110 via a web-interface (e.g., by using a web browser, etc.). For example, administrator system 150 communicates with integrated file system service 110 via a web-browser installed on administrator system 150. As another example, administrator system 150 communicates with integrated file system service 110 via an application running on administrator system 150.

Figure 2:
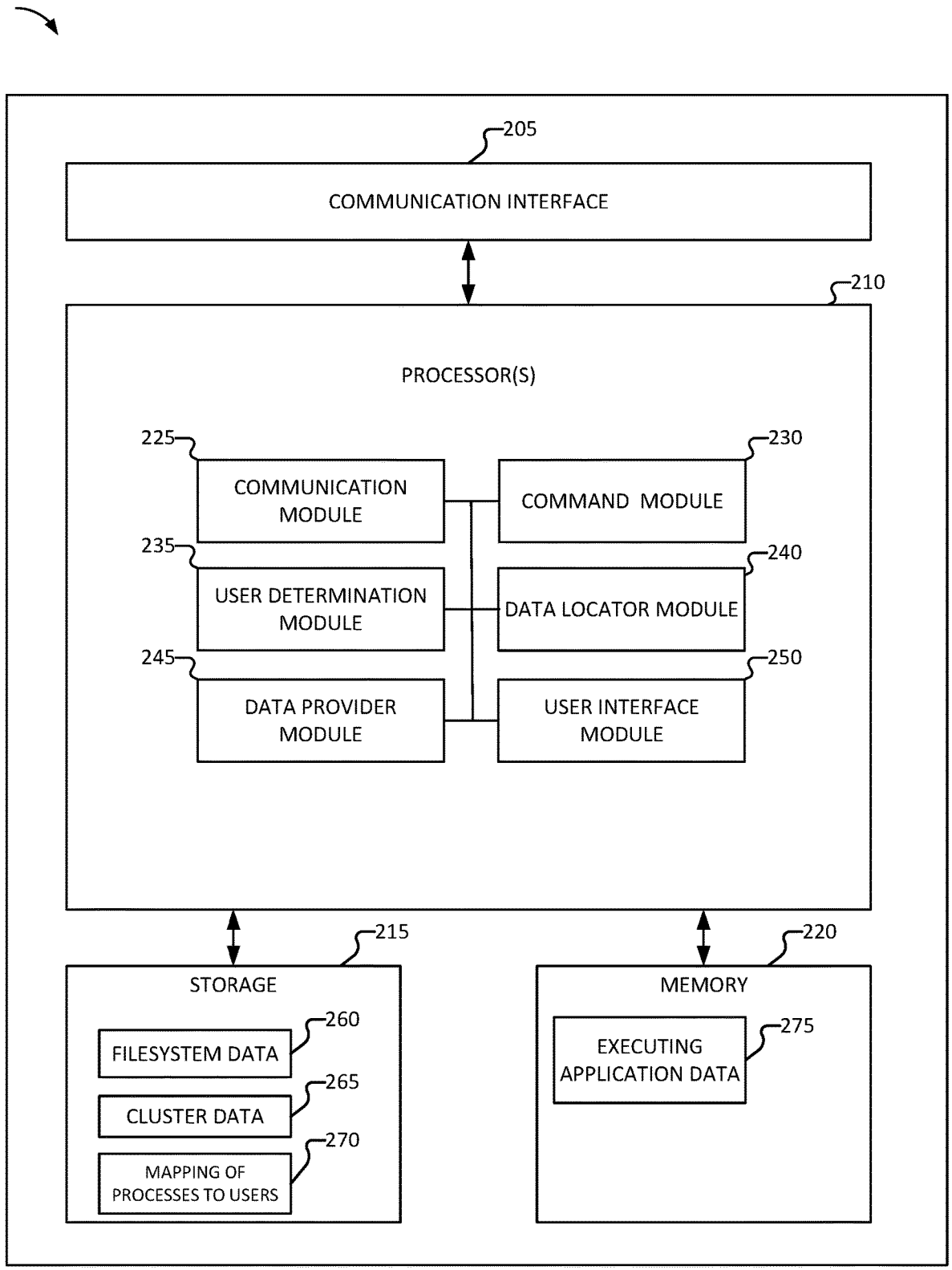
FIG. 2 is a block diagram of an integrated file system according to various embodiments of the present application.

FIG. 2 is a block diagram of an integrated file system according to various embodiments of the present application. According to various embodiments, system 200 is implemented at least in part by system 100 of FIG. 1. In some embodiments, system 200 implements at least part of process 300 of FIG. 3, process 400 of FIG. 4, process 500 of FIG. 5, process 600 of FIG. 6, and/or process 700 of FIG. 7.

In the example shown, system 200 implements one or more modules in connection with providing a files system service to a user, to execute commands or code in connection with a user request, to update files or code in response to user input at a user system. System 200 comprises communication interface 205, one or more processors 210, storage 215, and/or memory 220. One or more processors 210 comprises one or more of communication module 225, command module 230, user determination module 235, data locator module 240, data provider module 245, and/or user interface module 250.

In some embodiments, system 200 comprises communication module 225. System 200 uses communication module 225 to communicate with various other systems such as a user system, an administrator system, and/or a data store (e.g., a distributed data storage system). For example, communication module 225 provides to communication interface 205 information that is to be communicated. As another example, communication interface 205 provides to communication module 225 information received by system 200. Communication module 225 is configured to receive user input to a user system such as a user input to a workspace provided on the user system (e.g., a workspace provided on a web interface on a browser of the user system). The user input to the user system can include the creation of a new file, a modification or update to a file, a query for a file (e.g., a csv file, a library, a module, etc.), a request to set one or more security policies (e.g., a permission with respect to accessing a file or a directory), etc.. For example, the user develops or requests execution of code in a workspace provided by a user system. Communication module 225 is configured to provide to various user systems information such as user interface (e.g., an interface corresponding to a workspace or notebook), information that is responsive to one or more queries or tasks requested to be executed, etc.

In some embodiments, system 200 comprises command module 230. System 200 uses command module 230 to receive and/or determine commands input by a user to a user system. For example, command module 230 receives from communication module 225 user inputs corresponding to a request to execute a command such as to access a file, to update a file, to delete a file, etc. In some embodiments, the command comprises a write command. In some embodiments, a first user inputs a first input comprising a first write command with respect to a file and a first user or a second user inputs a second input comprising a second write command with respect to the file. In some embodiments, the second write command is received after the first write command. In some embodiments, the second write command conflicts at least partially with the first write command. In some embodiments, command module 230 is implemented by data layer 115 and/or control layer 120. Command module 230 can distinguish between a data operation and an organization operation. For example, a determination of whether the command is for a data operation organization operation is used to determine whether an access to the data store (e.g., the distributed data storage system) is to be performed via the control layer (e.g., for the access to be mediated by the control layer) or by the data layer. In some embodiments, in response to command module 230 receiving a command (e.g., from a user on a user system), command module 230 shares the command/operation among all users with access to the data layer for the customer (or all customers with a predetermined permission level). In some embodiments, in response to receiving a command, command module 230 invokes one or more corresponding processes in connection with executing the command (e.g., the one or more processes can be system-level processes such as RPCs).

According to various embodiments, command module 230 logs the command in association with the user (e.g., the user that requested the command such as a request to access a file in the data store). For example, command module 230 stores the command and user in a mapping of commands to users. The mapping of commands to users is used in connection with determining whether a user is authorized (e.g., has requisite permissions) to perform a certain command such as accessing a particular file, deleting a particular file, copying a particular file, renaming a particular file, creating a new directory, etc. In some embodiments, command module 230 determines one or more processes invoked in response to the command. As an example, the one or more processes are low-level or system-level processes. In response to determining the one or more processes (or in response to invocation of such processes), command module 230 logs an association between the user that executed the command and/or the process. For example, a process has an associated process identifier (also referred to herein as a PID) that uniquely identifies the process among other processes executed by the system. The logging of the association between the user that executed the command and the process comprises storing a user identifier and an association with the PID(s) in a mapping of processes to users.

According to various embodiments, command module 230 pre-fetches certain files based at least in part on a command that is received such as from a user system. For example, in response to a determination that a user has imported a module such as to the workspace on an interface at the user system, command module 230 analyzes the module (e.g., the source code for the module) and determines one or more files or modules that are referenced or expected to be called by the module (e.g., called during execution of the module). In response to determining that one or more files or modules that are referenced or expected to be called by the module, command module 230 requests such files or modules from the data store and locally stores (e.g., caches) the files or modules.

In some embodiments, system 200 comprises user determination module 235. System 200 uses user determination module 235 to determine a user associated with an operation (e.g., a command, a process, etc.). User determination module 235 determines the user associated with an operation based at least in part on querying a mapping of commands to users or a mapping of processes to users. According to various embodiments, users are traced to commands via associating with processes (e.g., system-level processes) a user corresponding to the command or operation for which the process was invoked. For example, user determination module 235 determines one or more processes associated with a command, and determines a user based on a mapping of processes to users.

In some embodiments, system 200 comprises data locator module 240. System 200 uses data locator module 240 to determine a location of data such as a location of a file corresponding to a received request to access a file. In some embodiments, data locator module 240 queries metadata pertaining to information stored in a data store (e.g., a distributed data storage system). The metadata can comprise an index (e.g., a master index structure) of files stored in the data store. In some embodiments, the index comprises information identifying a location of files stored in the data store. In response to determining that a file is to be accessed, or that an operation is to be performed with respect to a file, a call is provided to data locator module 240 to return a location of the corresponding file. In response to receiving the call for the location, data locator module 240 returns to the service or module that issued the call information pertaining to the location of the file. In some embodiments, data locator module 240 is implemented at the control layer 120 of integrated file system service 110.

In some embodiments, system 200 comprises data provider module 245. System 200 uses data provider module 245 in connection with providing data. For example, data provider module 245 provides data to a user system in response to receiving a request for such data. In some embodiments, the data provided is a URL directed to a location at which a file (e.g., a requested file) is stored in the data store. In some embodiments, data provider module 245 generates the URL. As an example, data provider module 245 generates the URL based at least in part on (i) information indicating a location at which the file is located (e.g., on the data store), and (ii) a credential to access the file (or a location at which the credential to access the file is to be retrieved). In some embodiments, the credential included or referenced in the URL is a customer token (e.g., a token for the local user corresponding to the data layer for the customer). In some embodiments, the credential included or referenced in the URL is a user token (e.g., a token for the user to which the URL is to be provided such as in response to a request to access the file).

In some embodiments, system 200 comprises user interface module 250. System 200 uses user interface module 250 to provide a workspace (e.g., a notebook such as a user interface for code development) to a user system. In some embodiments, user interface module 250 provides the workspace in a web user interface that is rendered at a user system (e.g., rendered in a web browser via which user system is accessing the system such as integrated file system service 110). User interface module 250 can further provide a user interface to administrator system 150 to enable an administrator to manage and/or configuring settings of system 200 or integrated file system service 110. In some embodiments, user interface module 250 provides a user interface for various other applications such as applications provided by business application layer 125.

According to various embodiments, storage 215 comprises one or more of file system data 260, cluster data 265, and/or a mapping of processes to users. Storage 215 comprises a shared storage (e.g., a network storage system) and/or database data, and/or user activity data. In some embodiments, file system data 260 comprises a database such as one or more datasets (e.g., one or more datasets for one or more features, etc.). File system data 260 comprises data such as a code being developed, code used in connection with development of a model, data generated in connection with executing code, modules imported into a workspace, etc. In some embodiments, cluster data 265 comprises information pertaining to one or more operations of a node in the cluster (e.g., a master node or a worker node in a set of worker nodes). As an example, cluster data 265 comprises information pertaining to a configuration or setting of the cluster, information generated during operation of the cluster, permissions of nodes in the cluster, information pertaining to commands received at the cluster (e.g., commands received at the data layer 115), etc. In some embodiments, mapping of processes to users 270 comprises information identifying users associated with commands or processes invoked in connection with the commands.

According to various embodiments, memory 220 comprises executing application data 275. Executing application data 275 comprises data obtained or used in connection with executing an application such as an application executing in connection with providing the workspace, an application that enforces security of data in the data store, an application that monitors data and operations of the data store, an application that executes code being developed in the workspace. In embodiments, the application comprises one or more applications that perform one or more of receive and/or execute a query or command, generate a report and/or configure information that is responsive to an executed query or command, and/or to provide to a user information that is responsive to a query or command. Other applications comprise any other appropriate applications (e.g., an index maintenance application, a communications application, a chat application, a web browser application, a document preparation application, a report preparation application, a user interface application, a data analysis application, an anomaly detection application, a user authentication application, a security policy enforcement application, a code analysis application, a code development application, etc.).

Figure 3:
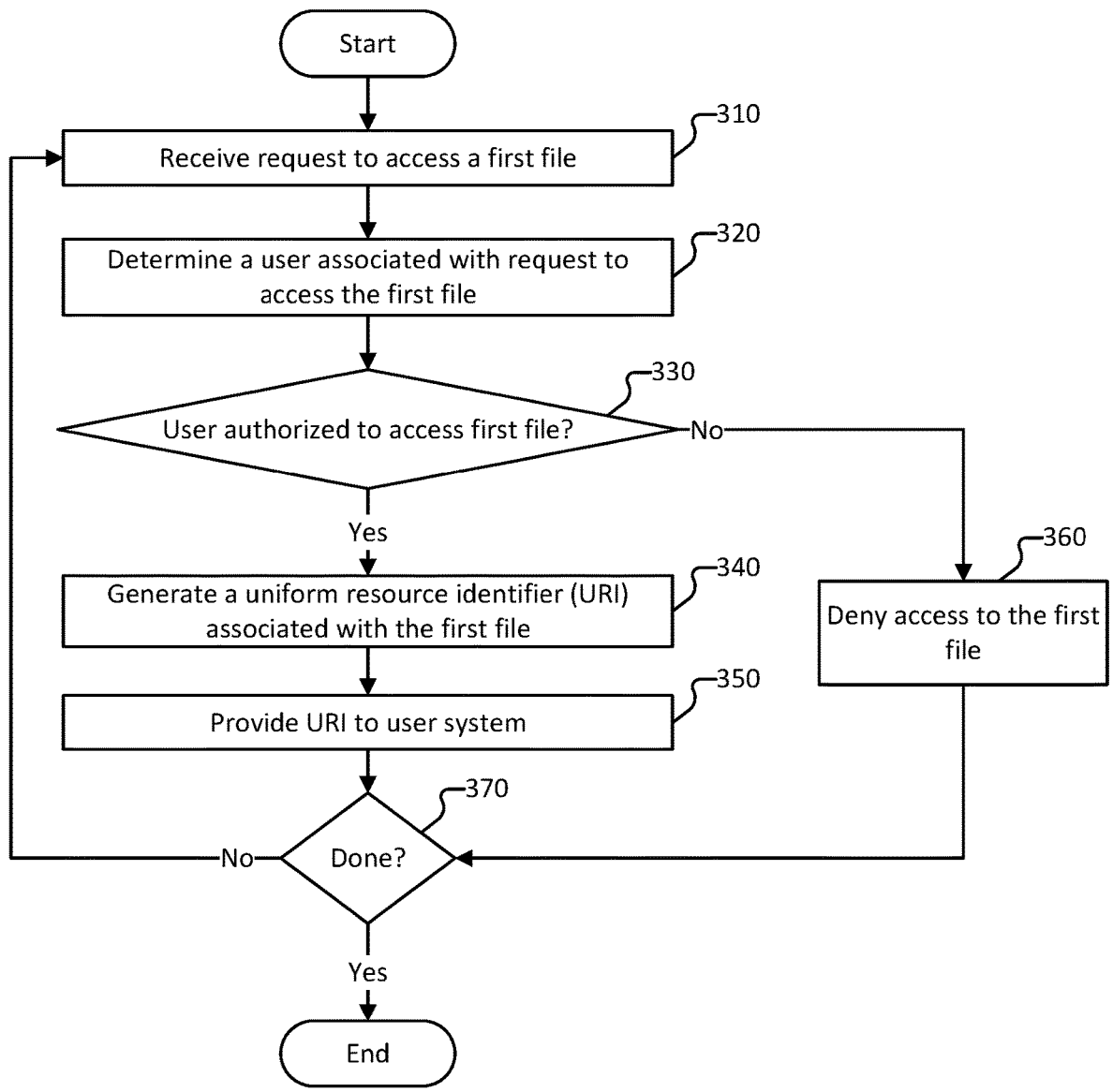
FIG. 3 is a flow diagram of a method for providing access to a file in a distributed data structure according to various embodiments of the present application.

FIG. 3 is a flow diagram of a method for providing access to a file in a distributed data structure according to various embodiments of the present application. According to various embodiments, process 300 is implemented at least in part by system 100 of FIG. 1 and/or system 200 of FIG. 2. In some embodiments, process 300 is implemented in connection with process 400 of FIG. 4, process 500 of FIG. 5, process 600 of FIG. 6, and/or process 700 of FIG. 7.

At 310, a request to access a first file is received. In some embodiments, the request to access the first file is received based at least in part on a user input to a user system. For example, the user input is input to a workspace (e.g., a notebook such as an interface via which code is developed by a user). In some embodiments, a control layer of the system intercepts the request to access the first file.

At 320, a user associated with the request to access the first file is determined. In some embodiments, the system determines the user associated with the request to access the first file based at least in part on a mapping of commands to users, or a mapping of processes to users. According to various embodiments, the user is determined based at least in part on querying the system mapping of commands to users, or a mapping of processes to users.

According to various embodiments, in response to receiving a command (e.g., based on a user input to the workspace), the system logs the command in association with the user. For example, the system stores the command and user in a mapping of commands to users. The mapping of commands to users is used in connection with determining whether a user is authorized (e.g., has requisite permissions) to perform a certain command such as accessing a particular file, deleting a particular file, copying a particular file, renaming a particular file, creating a new directory, etc. In some embodiments, the system determines one or more processes invoked in response to the command. As an example, the one or more processes are low-level or system-level processes. In response to determining the one or more processes (or in response to invocation of such processes), the system logs an association between the user that executed the command and/or the process. For example, a process has an associated process identifier (also referred to herein as a PID) that uniquely identifies the process among other processes executed by the system. The logging of the association between the user that executed the command and the process comprises storing a user identifier and an association with the PID(s) in a mapping of processes to users.

At 330, a determination is made as to whether the user is authorized to access the first file. In some embodiments, in response to determining the user associated with the request to access the first file, the system determines whether the user is authorized to access the first file. The system determines whether the user is authorized to access the first file based at least in part on permissions of the user and/or permissions required to access the first file. In some embodiments, a control layer of the system determines whether the user is authorized to access the first file.

In response to a determination that the user is authorized to access the first file at 330, process 300 proceeds to 340 at which a URI associated with the first file is generated. In some embodiments, the URI comprises URL. In some embodiments, the URI includes a temporary token which grants access to the object in blob store (e.g., a pre-signed URL). In some embodiments, the system generates the URL based at least in part on (i) information indicating a location at which the file is located (e.g., on the data store), and (ii) a credential to access the file (or a location at which the credential to access the file is to be retrieved). In some embodiments, the credential included or referenced in the URL is a customer token (e.g., a token for the local user corresponding to the data layer for the customer). In some embodiments, the credential included or referenced in the URL is a user token (e.g., a token for the user to which the URL is to be provided such as in response to a request to access the file). According to various embodiments, a control layer of the system generates the URL.

At 350, the URI is provided to a user system. In some embodiments, the URI comprises a URL. In some embodiments, the system provides the URL to a user interface of the user system. As an example, the notification is provided to a user interface at the user system such as at via a web interface (e.g., a workspace). In some embodiments, the URL is provided on a user interface in which files stored in the data store are presented in a hierarchy (e.g., a hierarchy according to a mapping of files to a hierarchy such as a hierarchy of a customer's files). For example, the user interface provides the URI in the manner of a selectable link on the user interface among a set of files within a hierarchical directory are provided.

Conversely, in response to a determination that the user is not authorized to access the first file at 330, process 300 proceeds to 360 at which access to the first file is denied. In some embodiments, in connection with denying access to the first file, the system provides a notification of such denial. For example, the system provides a notification to a user via user system. As an example, the notification is provided to a user interface at the user system such as via a web interface (e.g., a notification in the workspace).

At 370, a determination is made as to whether process 300 is complete. In some embodiments, process 300 is determined to be complete in response to a determination that no further commands are to be performed or that no further files are to be accessed, a user has indicated that no further files are to be accessed, the user has exited the system, an administrator indicates that process 300 is to be paused or stopped, a determination that a fault occurred at the data store or in execution of code via the workspace, etc. In response to a determination that process 300 is complete, process 300 ends. In response to a determination that process 300 is not complete, process 300 returns to 310.

Figure 4:
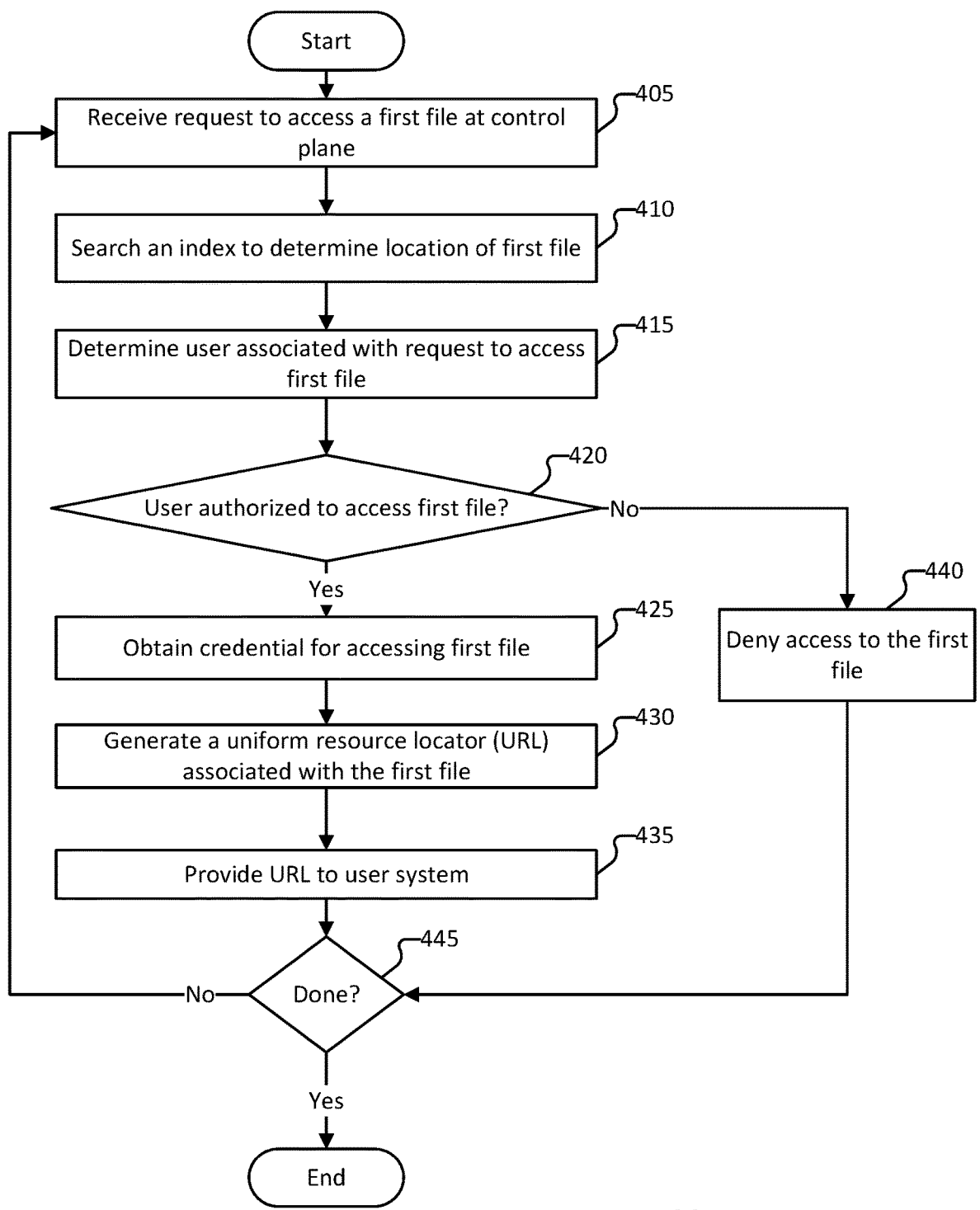
FIG. 4 is a flow diagram of a method at a control layer for providing access to a file in a distributed data structure according to various embodiments of the present application.

FIG. 4 is a flow diagram of a method at a control layer for providing access to a file in a distributed data structure according to various embodiments of the present application. According to various embodiments, process 400 is implemented at least in part by system 100 of FIG. 1 and/or system 200 of FIG. 2. In some embodiments, process 400 is implemented in connection with process 300 of FIG. 3, process 500 of FIG. 5, process 600 of FIG. 6, and/or process 700 of FIG. 7.

At 405, a request to access a first file is received at a control plane. In some embodiments, 405 corresponds to, or is similar to, 310 of process 300 of FIG. 3. According to various embodiments, the control plane intercepts the request to access the first file based at least in part on intercepting a user input to a workspace provided at a user system.

At 410, an index is searched to determine the location of the first file. In some embodiments, the index is a master index structure stored at (or accessible by) the control layer of the system such as the integrated file system service 110. The index indexes data stored in the data store (e.g., the distributed data storage system). Data stored in the data store is stored in a non-hierarchical manner and distributed across various nodes. Accordingly, the index is used to bring order to customer data stored in the data store.

At 415, the user associated with the request to access the first file. In some embodiments, 415 corresponds to, or is similar to, 320 of process 300 of FIG. 3.

At 420, a determination is made as to whether the user is authorized to access the first file. In some embodiments, 420 corresponds to, or is similar to, 330 of process 300 of FIG. 3.

In response to a determination that the user is authorized to access the first file at 420, process 400 proceeds to 425 at which a credential for accessing the first file is obtained. In some embodiments, the system obtains the credential based at least in part on the user associated with the request to access the first file. As an example, the control layer of the system obtains the credential for accessing the file. In some embodiments, the credential is a token.

According to various embodiments, the system stores a set of two orthogonal tokens. The set of two orthogonal tokens comprises a first token corresponding to a customer (e.g., an organization/customer of the integrated file system service such as with which a plurality of users is associated). The set of two orthogonal tokens comprises a second token corresponding to a user (e.g., a user associated with an organization/customer of the integrated file system service). In some embodiments, the control layer uses the customer token (e.g., the first token) to access the distributed data storage system (e.g., a data store) to access a file or in connection with accessing metadata (e.g., stored at the control layer) pertaining to the distributed data storage system. As an example, the control layer replaces the customer token with the user token (e.g., the second token) when providing a user system with the URL for the file associated with an access request from the user system.

At 430, a URL associated with the first file is generated. In some embodiments, 430 corresponds to, or is similar to, 340 of process 300 of FIG. 3.

At 435, the URL is provided to a user system. In some embodiments, 430 corresponds to, or is similar to, 350 of process 300 of FIG. 3.

Conversely, in response to a determination that the user is not authorized to access the first file at 420, process 400 proceeds to 440 at which access to the first file is denied. In some embodiments, 440 corresponds to, or is similar to, 360 of process 300 of FIG. 3.

At 445, a determination is made as to whether process 400 is complete. In some embodiments, process 400 is determined to be complete in response to a determination that no further commands are to be performed or that no further files are to be accessed, a user has indicated that no further files are to be accessed, the user has exited the system, an administrator indicates that process 400 is to be paused or stopped, a determination that a fault occurred at the data store or in execution of code via the workspace, etc. In response to a determination that process 400 is complete, process 400 ends. In response to a determination that process 400 is not complete, process 400 returns to 405.

Figure 5:
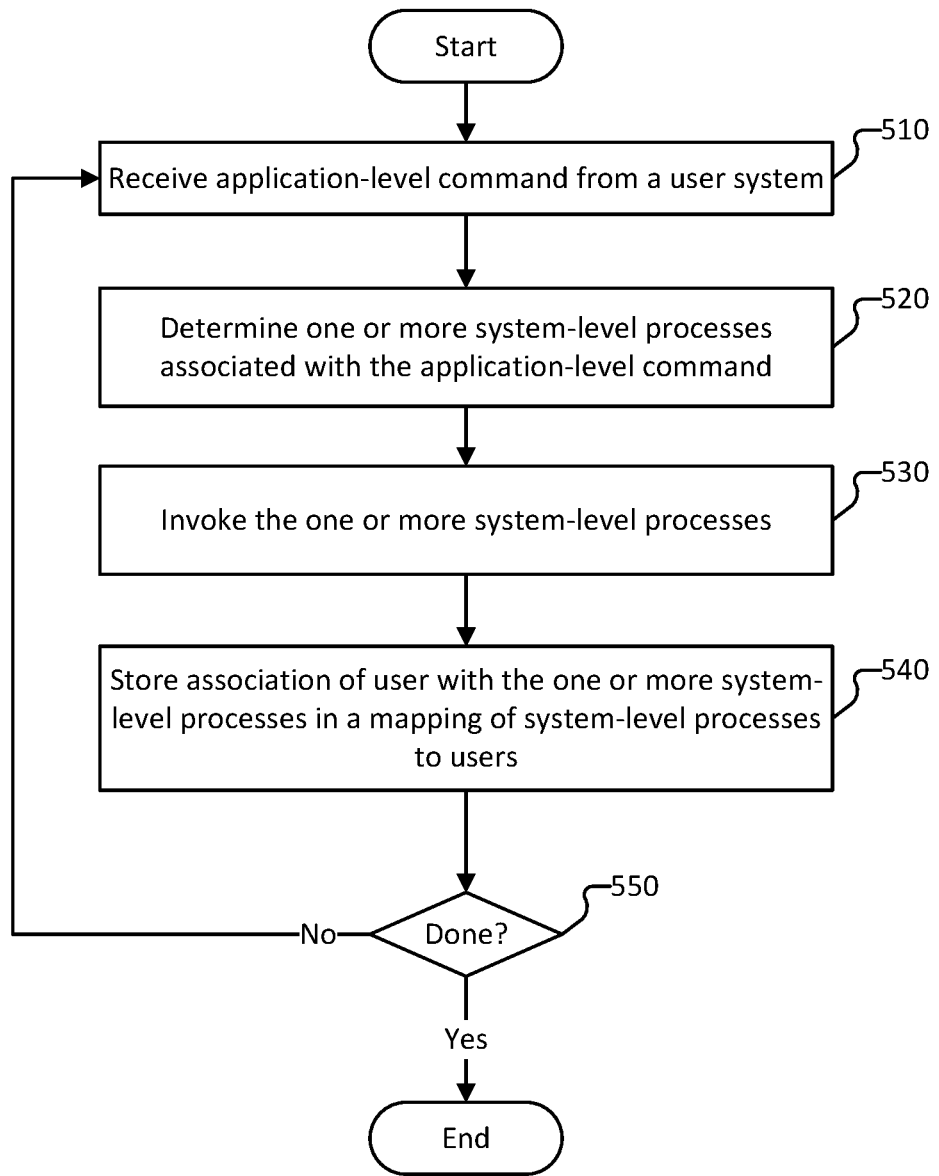
FIG. 5 is a flow diagram of a method for associating users with application-level commands according to various embodiments of the present application.

FIG. 5 is a flow diagram of a method for associating users with application-level commands according to various embodiments of the present application. According to various embodiments, process 500 is implemented at least in part by system 100 of FIG. 1 and/or system 200 of FIG. 2. In some embodiments, process 500 is implemented in connection with process 300 of FIG. 3, process 400 of FIG. 4, process 600 of FIG. 6, and/or process 700 of FIG. 7. In some embodiments, process 500 is invoked/performed in connection with determining a user associated with a command such as at 310 of process 300 of FIG. 3. For example, process 500 is implemented in connection with tracing or logging a user associated with application-level commands (e.g., as the application-level commands are used to invoke corresponding system-level processes).

At 510, an application-level command is received from a user system. In some embodiments, the system receives an application-level command based at least in part on a user input to a user system such as a user input to a workspace provided by the user system. As an example, the workspace is provided in a web user interface.

At 520, one or more system-level processes associated with the command are determined. In some embodiments, the system determines one or more system-level processes that are to be invoked/performed in connection with performing the application-level command. For example, an application-level command has a set of corresponding system-level processes that are executed to accomplish the application-level command.

At 530, one or more system-level processes are invoked. In some embodiments, in response to receiving the application-level command and the one or more invoked processes corresponding to the application level command, the one or more system-level processes are invoked. In some embodiments, a data layer in the system (e.g., the integrated file system service) executes the one or more system-level processes.

At 540, information associating the user with the one or more system-level processes are stored in a mapping of system-level processes to users. In some embodiments, in association with invoking/executing a system-level process, the system stores a mapping of a user to the system-level process. As an example, the system logs an association between the user that executed the command and/or the process. For example, a process has an associated process identifier (also referred to herein as a PID) that uniquely identifies the process among other processes executed by the system. The logging of the association between the user that executed the command and the process comprises storing a user identifier the user an association with the PID(s) in a mapping of processes to users. In various embodiments, information logged as part of mapping includes user information, a mapping of commands to user, a mapping of system calls to users, a process that is making the system call (e.g., python, R, java, from web terminal, etc.), or any other appropriate information.

At 550, a determination is made as to whether process 500 is complete. In some embodiments, process 500 is determined to be complete in response to a determination that no further commands are to be performed or that no further files are to be accessed, a user has indicated that no further files are to be accessed, the user has exited the system, an administrator indicates that process 500 is to be paused or stopped, a determination that a fault occurred at the data store or in execution of code via the workspace, etc. In response to a determination that process 500 is complete, process 500 ends. In response to a determination that process 500 is not complete, process 500 returns to 510.

Figure 6:
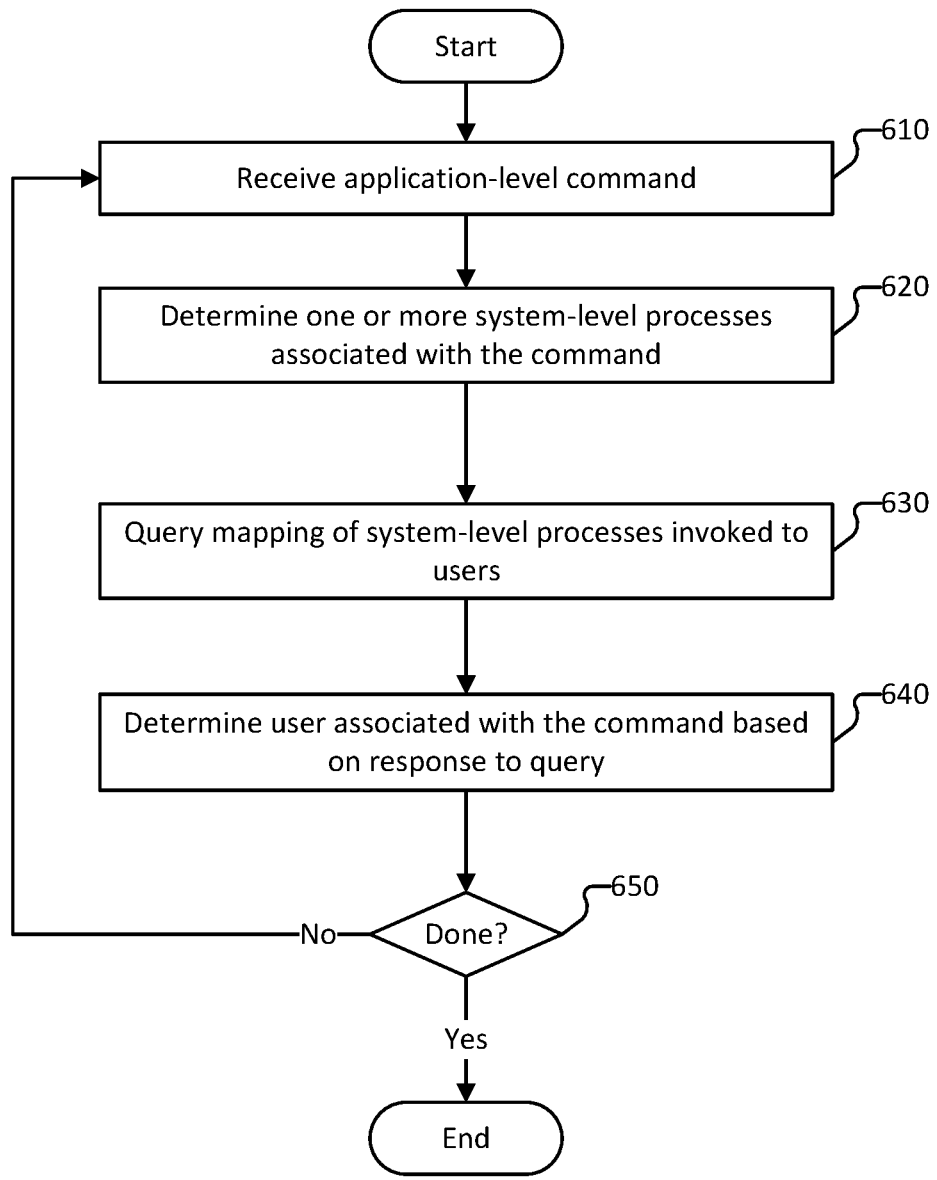
FIG. 6 is a flow diagram of a method for determining users associated with application-level commands according to various embodiments of the present application.

FIG. 6 is a flow diagram of a method for determining users associated with application-level commands according to various embodiments of the present application. According to various embodiments, process 600 is implemented at least in part by system 100 of FIG. 1 and/or system 200 of FIG. 2. In some embodiments, process 600 is implemented in connection with process 300 of FIG. 3, process 400 of FIG. 4, process 500 of FIG. 5, and/or process 700 of FIG. 7. In some embodiments, process 600 is invoked/performed in connection with determining a user associated with a command such as at 320 of process 300 of FIG. 3.

At 610, an application-level command is received. In some embodiments, the system receives an application-level command based at least in part on a user input to a user system such as a user input to a workspace provided by the user system. As an example, the workspace is provided in a web user interface. In some embodiments, a control layer in the system (e.g., the integrated file system service) intercepts a user input corresponding to the application-level command.

At 620, one or more system-level processes associated with the command are determined. In some embodiments, the system determines one or more system-level processes that were invoked in connection with performing the application-level command. For example, an application-level command has a set of corresponding system-level processes that were executed to accomplish the application-level command.

At 630, a mapping of system-level processes invoked to users is queried. In response to determining one or more system-level processes that were invoked in connection with executing the application-level command, the system queries the mapping to determine the corresponding user (e.g., the user that requested the application-level command). In some embodiments, the mapping is queried in connection with determining whether to permit the application-level command or the corresponding one or more system-level processes such as based on a determination of whether a user has requisite permissions/authorization to request or execute such application-level command.

At 640, a user associated with the command is determined based at least in part on a response to the query.

At 650, a determination is made as to whether process 500 is complete. In some embodiments, process 600 is determined to be complete in response to a determination that no further commands are to be performed or that no further files are to be accessed, a user has indicated that no further files are to be accessed, the user has exited the system, an administrator indicates that process 600 is to be paused or stopped, a determination that a fault occurred at the data store or in execution of code via the workspace, etc. In response to a determination that process 600 is complete, process 600 ends. In response to a determination that process 600 is not complete, process 600 returns to 610.

Figure 7:
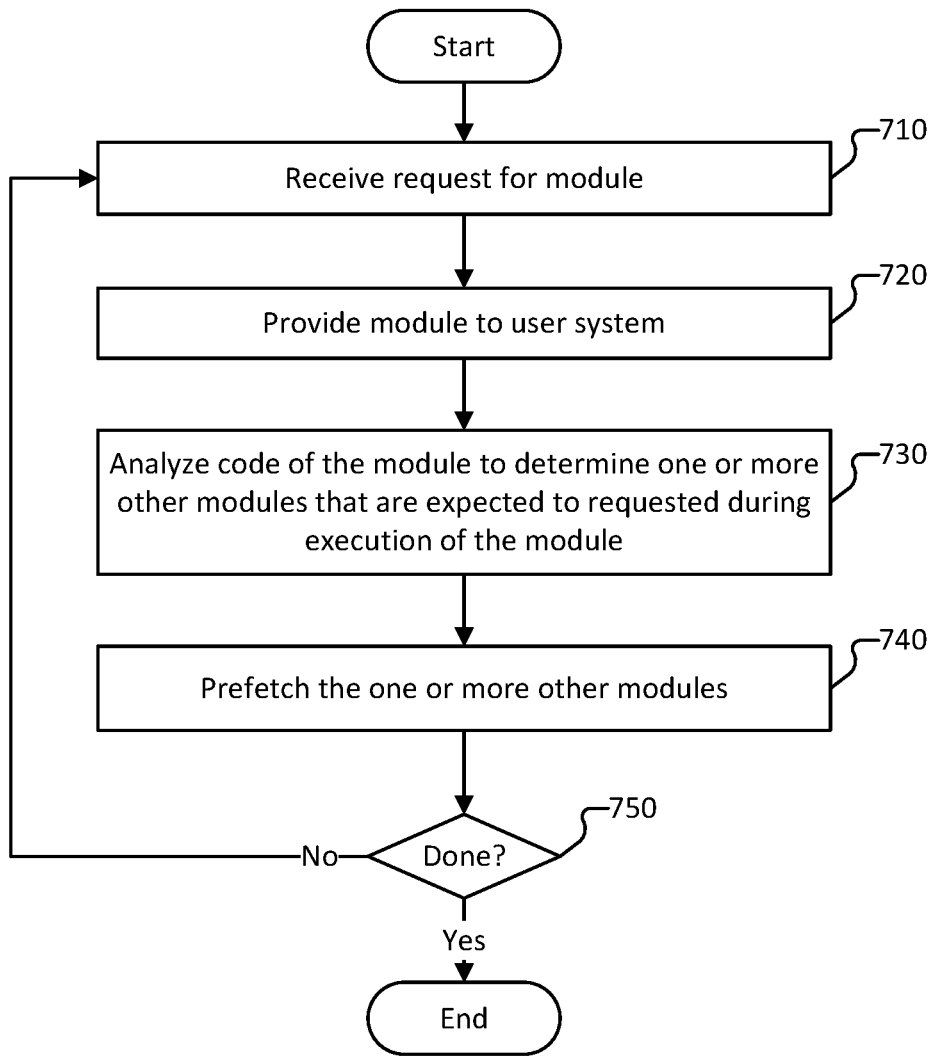
FIG. 7 is a flow diagram of a method for importing modules according to various embodiments of the present application.

FIG. 7 is a flow diagram of a method for importing modules according to various embodiments of the present application. According to various embodiments, process 700 is implemented at least in part by system 100 of FIG. 1 and/or system 200 of FIG. 2. In some embodiments, process 700 is implemented in connection with process 300 of FIG. 3, process 400 of FIG. 4, process 500 of FIG. 5, and/or process 600 of FIG. 6.

At 710, a request for a module is received. In some embodiments, the request for the module is received based at least in part on a user input to a user system. As an example, the request for the module corresponds to a user input corresponding to an import of the module to a workspace (e.g., a notebook such as an interface via which code is developed by a user). For example, the user input is input to a workspace to include or reference the module in code being developed. In some embodiments, a control layer of the system intercepts the request to access the first file.

At 720, the module is provided to the user system. In some embodiments, the module is imported to the workspace.

At 730, code of the module is analyzed in connection with determining one or more other modules that are expected to be requested during execution of the module. In some embodiments, the system determines one or more other modules that are referenced in, or referenced by, the module imported to the workspace for the user system. The system deems another module to be expected to be requested during the execution of the module based on the other module being referenced in, or referenced by, source code for the module imported to the workspace.

At 740, the one or more other modules are pre-fetched. According to various embodiments, in response to the system determining one or more other modules that are expected to be requested during execution of the module, the system pre-fetches the one or more other modules and locally stores the one or more other modules (e.g., in a cache of an integrated file system service). Pre-fetching the one or more other modules reduces the latency associated with executing code in which the module is imported.

At 750, a determination is made as to whether process 700 is complete. In some embodiments, process 700 is determined to be complete in response to a determination that no further commands are to be performed or that no further files are to be accessed, a user has indicated that no further files are to be accessed, the user has exited the system, an administrator indicates that process 700 is to be paused or stopped, a determination that a fault occurred at the data store or in execution of code via the workspace, etc. In response to a determination that process 700 is complete, process 700 ends. In response to a determination that process 700 is not complete, process 700 returns to 710.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more processors; and
a memory coupled with the one or more processors, the memory comprising stored instructions to cause, upon execution, the one or more processors to:
receive a request to access a first file in a distributed data storage system storing data of an organization, wherein the request is associated with an account of the organization, the account corresponding to a plurality of users;
determine that a control layer is authorized to access the data of the organization stored in the distributed data storage system;
generate an organization-level credential based on the determination, wherein the first file is associated with a uniform resource identifier (URI), and wherein the URI comprises a location of the first file in the distributed data storage system and the organization-level credential of the account of the organization, wherein the organization-level credential is not associated with any particular user and is an internal credential that enables the control layer to access the first file;

determine a first user associated with the request to access the first file based on a mapping between the first user and system-level processes invoked in connection with the request, wherein the first user is from among the plurality of users associated with the account of the organization;

determine whether the first user is authorized to access the first file; and responsive to the determination that the first user is authorized to access the first file:

configure the URI to replace the organization-level credential of the account of the organization with a user-level credential of the first user from among the plurality of users of the organization; and provide the URI to a user system.

2. The system of claim 1, further comprising stored instructions to cause, upon execution, the one or more processors to:

obtain a command based at least in part on a user input, wherein the user input is provided by a second user; and log, when the command is obtained, the second user as being associated with the command in a mapping of requested commands to users.

3. The system of claim 2, wherein:

the command is received in connection with user information that indicates the second user for which the command is invoked.

4. The system of claim 3, wherein:

the user input comprises the command and the user information; and the instructions to log the second user associated with the command further comprises stored instructions to cause, upon execution, the one or more processors to:

determine an identifier of the command from the user input;

extract the user information and determine that the second user is associated with the command; and store the identifier of the command in association with the user information indicating that the second user invoked the command.

5. The system of claim 4, wherein the instructions to extract the user information further comprises stored instructions to cause, upon execution, the one or more processors to obtain the user information from a system-level process invoked in response to receiving the command.

6. The system of claim 5, wherein the user information comprises one or more of an identifier of the second user for which the command was invoked, and a token associated with the second user.

7. The system of claim 1, further comprising stored instructions to cause, upon execution, the one or more processors to:

obtain a command based at least in part on a user input, wherein the user input is provided by the first user or a second user;

determine one or more system-level processes corresponding to the command;

invoke one or more system calls corresponding to the one or more system-level processes, wherein user information indicating the first user or the second user associated with the command corresponding to the one or more system-level processes is provided in connection with the one or more system calls; and when the one or more system calls are invoked, obtain the user information provided in connection with the one or more system calls; and log the user information in one or more of (i) a mapping of commands to users, and (ii) a mapping of system calls to users, wherein the user information that is logged indicates that the first user or the second user is indicative of being associated with the command.

8. The system of claim 7, wherein the second user is determined to correspond to the command based at least in part on performing a query for the user information that is logged against one or more of (i) the mapping of commands to users, and (ii) the mapping of system calls to users.

9. The system of claim 7, wherein providing the instructions to provide the user information in connection with the one or more system calls further comprises stored instructions to cause, upon execution, the one or more processors to: include the user information within the one or more system calls.

10. The system of claim 7, wherein the user information indicating the first user or the second user associated with the command comprises one or more of an identifier of the first user or the second user who invoked the command and a token associated with the first user or the second user.

11. The dydtem of claim 1, wherein the one or more processors are further configured to:

determine that a module is imported to a business application layer; and in response to determining that the module is imported to the business application layer, analyze source code for the module to determine one or more modules referenced in the source code; and retrieve the one or more modules referenced in the source code.

12. The system of claim 11, wherein the one or more modules referenced in the source code are retrieved before a request from a source code requesting user expressly requesting or importing the one or more modules is received.

13. The system of claim 11, wherein the one or more modules referenced in the source code are pre-fetched before executing of the source code.

14. The system of claim 11, wherein retrieving the one or more modules referenced in the source code comprises pre-fetching the one or more modules from a distributed system and stored on the business application layer.

15. The system of claim 1, further comprising stored instructions to cause, upon execution, the one or more processors to:

obtain a command based at least in part on a user input from the first user or a second user;

intercept one or more system calls generated based at least in part on the command; and update a file on a distributed file system based at least in part on the intercepting of the one or more system calls.

16. The system of claim 1, further comprising stored instructions to cause, upon execution, the one or more processors to:

receive a first write command with respect to a second file, wherein the first write command is received based at least in part on a first input from the first user;

receive a second write command with respect to the second file, wherein the second write command is received based at least in part on a second input from the first user or a second user; and update the second file to reflect at least the second write command, wherein:

the second write command is received after the first write command, and the second write command at least partially conflicting with the first write command.

17. The system of claim 1, wherein the instructions to provide the URI comprises instructions to cause, upon execution, the one or more processors to provide a uniform resource locator (URL) to the user system and to cause a user interface of the user system to display the URL.

18. The system of claim 1, further comprising stored instructions to cause, upon execution, the one or more processors to:
generate the URI by determining the location of the first file; and
use the organization-level credential and the location of the first file to build the URI according to a predetermined format.

19. A method, comprising:
receiving a request to access a first file in a distributed data storage system storing data of an organization, wherein the request is associated with an account of the organization, the account corresponding to a plurality of users;
determining that a control layer is authorized to access the data of the organization stored in the distributed data storage system;
generating an organization-level credential based on the determination, wherein the first file is associated with a uniform resource identifier (URI), and wherein the URI comprises a location of the first file in the distributed data storage system and the organization-level credential of the account of the organization, wherein the organization-level credential is not associated with any particular user and is an internal credential that enables the control layer to access the first file;
determining a first user associated with the request to access the first file based on a mapping between the first user and system-level processes invoked in connection with the request, wherein the first user is from among the plurality of users associated with the account of the organization;
determining whether the first user is authorized to access the first file; and
in response to determining that the first user is authorized to access the first file:
configuring the URI to replace the organization-level credential of the account of the organization with a user-level credential of the first user from among the plurality of users of the organization; and
providing the URI to a user system.

20. A non-transitory computer-readable storage medium storing instructions that, when executed by one or more processors, cause the one or more processors to perform operations comprising:
receiving a request to access a first file in a distributed data storage system storing data of an organization, wherein the request is associated with an account of the organization, the account corresponding to a plurality of users;
determining that a control layer is authorized to access the data of the organization stored in the distributed data storage system;
generating an organization-level credential based on the determination, wherein the first file is associated with a uniform resource identifier (URI), and wherein the URI comprises a location of the first file in the distributed data storage system and the organization-level credential of the account of the organization, wherein the organization-level credential is not associated with any particular user and is an internal credential that enables the control layer to access the first file;
determining a first user associated with the request to access the first file based on a mapping between the first user and system-level processes invoked in connection with the request, wherein the first user is from among the plurality of users associated with the account of the organization;
determining whether the first user is authorized to access the first file; and
in response to determining that the first user is authorized to access the first file:
configuring the URI to replace the organization-level credential of the account of the organization with a user-level credential of the first user from among the plurality of users of the organization; and
providing the URI to a user system.

* * * * *

UNITED STATES PATENT AND TRADEMARK OFFICE
CERTIFICATE OF CORRECTION

| | | |
|---|---|---|
| PATENT NO. | : 12,400,011 B1 | Page 1 of 1 |
| APPLICATION NO. | : 17/515013 | |
| DATED | : August 26, 2025 | |
| INVENTOR(S) | : Davidson et al. | |

It is certified that error appears in the above-identified patent and that said Letters Patent is hereby corrected as shown below:

In the Claims

In Column 26, in Claim 11, Line 22, delete "dydtem" and insert -- system --, therefor.

In Column 26, in Claim 13, Line 38, delete "executing" and insert -- execution --, therefor.

Signed and Sealed this
Twenty-first Day of October, 2025

John A. Squires
*Director of the United States Patent and Trademark Office*